(12) United States Patent
Malinverni et al.

(10) Patent No.: US 10,372,240 B2
(45) Date of Patent: Aug. 6, 2019

(54) MANUAL DEVICE COMPRISING A REVERSIBLE TIP FOR A CAPACITIVE SCREEN

(71) Applicant: SOCIETE BIC, Clichy (FR)

(72) Inventors: Samuel Malinverni, Paris (FR); Arnaud Bez, Garches (FR)

(73) Assignee: SOCIETE BIC, Clichy (FR)

( * ) Notice: Subject to any disclaimer, the term of this patent is extended or adjusted under 35 U.S.C. 154(b) by 0 days.

(21) Appl. No.: 15/527,492

(22) PCT Filed: Nov. 18, 2015

(86) PCT No.: PCT/FR2015/053111
§ 371 (c)(1),
(2) Date: May 17, 2017

(87) PCT Pub. No.: WO2016/079422
PCT Pub. Date: May 26, 2016

(65) Prior Publication Data
US 2017/0329422 A1    Nov. 16, 2017

(51) Int. Cl.
*G06F 3/0354* (2013.01)
*B43K 29/00* (2006.01)
*G06F 3/044* (2006.01)

(52) U.S. Cl.
CPC .......... *G06F 3/03545* (2013.01); *B43K 29/00* (2013.01); *G06F 3/044* (2013.01)

(58) Field of Classification Search
None
See application file for complete search history.

(56) References Cited

U.S. PATENT DOCUMENTS

| 7,066,673 | B1 | 6/2006 | Kuo |
| 8,576,203 | B2 | 11/2013 | Nakata et al. |
| 2004/0154172 | A1 | 8/2004 | Tatz |
| 2005/0212780 | A1 | 9/2005 | Tokkonen |
| 2005/0279231 | A1* | 12/2005 | Lee ..................... B44B 5/0085 101/3.1 |

(Continued)

FOREIGN PATENT DOCUMENTS

| CN | 2754896 Y | 2/2006 |
| CN | 200988363 Y | 12/2007 |

(Continued)

OTHER PUBLICATIONS

International Search Report dated Feb. 10, 2016 from corresponding International Patent Application PCT/FR2015/053111, 5 pages.

(Continued)

*Primary Examiner* — Brian M Butcher
(74) *Attorney, Agent, or Firm* — Ohlandt, Greeley, Ruggiero & Perle, L.L.P.

(57) ABSTRACT

A manual device comprising a body, and at least one reversible tip mounted on the body, the reversible tip comprising a first head, a second head opposite to the first head, a conductive outer casing, an internal part arranged inside the casing, the first head comprising a first pad for a capacitive screen, the first head and the second head being blocked between the internal part and the casing while the internal part is assembled by snap-fitting to the casing, the first head and the second head projecting from the casing.

13 Claims, 3 Drawing Sheets

(56) References Cited

U.S. PATENT DOCUMENTS

| | | |
|---|---|---|
| 2011/0304577 A1 | 12/2011 | Brown et al. |
| 2011/0316815 A1 | 12/2011 | Fang |
| 2012/0039662 A1 | 2/2012 | Zhang et al. |
| 2012/0154340 A1 | 6/2012 | Vuppu et al. |
| 2012/0194484 A1 | 8/2012 | Lehman |
| 2012/0262429 A1 | 10/2012 | Hsu et al. |
| 2013/0194242 A1 | 8/2013 | Park et al. |
| 2013/0322952 A1 | 12/2013 | Zhang et al. |
| 2014/0028636 A1 | 1/2014 | Zhang et al. |
| 2014/0125606 A1 | 5/2014 | Namkung |
| 2016/0116999 A1 | 4/2016 | Boisdevesys et al. |
| 2016/0216786 A1 | 7/2016 | Rolion |

FOREIGN PATENT DOCUMENTS

| | | |
|---|---|---|
| CN | 201304798 | 9/2009 |
| CN | 201773366 | 3/2011 |
| CN | 201970658 U | 9/2011 |
| CN | 202177872 U | 3/2012 |
| CN | 102902380 A | 1/2013 |
| CN | 202711186 | 1/2013 |
| GB | 2496381 A | 5/2013 |
| JP | 63-282516 A | 11/1988 |
| JP | 3171232 U | 10/2011 |
| JP | 2012-128486 A | 7/2012 |
| JP | 2012-226554 A | 11/2012 |
| KR | 10-2010-0125631 | 12/2010 |
| WO | 2012/094633 A1 | 7/2012 |
| WO | 2012103323 A1 | 8/2012 |

OTHER PUBLICATIONS

Chinese Office Action dated Dec. 25, 2017 from related Chinese Patent Application 2014800310025, 11 pages.

Japanese Office Action dated Jan. 25, 2018 from related Japanese Patent Application 2016-516224, 6 pages.

International Search Report dated Aug. 13, 2014 from related PCT/FR2014/051255, 7 pages.

Chinese First Office Action dated Jul. 17, 2018 in corresponding Chinese Patent Application No. 201580062563.6, 13 pages.

Second Chinese Office Action dated Dec. 5, 2018 in corresponding Chinese Patent Application No. 2014800310025, 11 pages.

\* cited by examiner

MANUAL DEVICE COMPRISING A REVERSIBLE TIP FOR A CAPACITIVE SCREEN

FIELD OF THE INVENTION

The invention relates to a manual device having a tip for a capacitive screen. Such a tip for a capacitive screen is capable of interfering/interacting with the capacitive screen in such a manner that its presence at a given point of said capacitive screen can be detected by the screen. By way of example, the capacitive screen may be a screen of a multimedia tablet or of a mobile telephone.

PRIOR ART

In order to use a capacitive screen, a stylus for a capacitive screen is often necessary. Nevertheless, such a stylus is a specific instrument presenting a single head for a predetermined capacitive screen, and is expensive.

SUMMARY OF THE INVENTION

The present invention relates to a manual device.

An embodiment provides a manual device comprising a body, said manual device including at least one reversible tip mounted on the body, the reversible tip comprising a first head and a second head opposite to the first head, the tip being configured to be mounted on the body in a first position in which the first head projects from the body while the second head is stored inside the body or in a second position in which the second head projects from the body while the first head is stored inside the body, the tip comprising a conductive outer casing and an internal part arranged inside the casing, while the first head comprises a first pad for a capacitive screen, the first head and the second head being blocked between the internal part and the casing while the internal part is assembled by snap-fitting to the casing, the first head and the second head projecting from the casing.

Below, and unless specified to the contrary, the term "conductive" should be understood as "electrically conductive". Conversely, below, and unless specified to the contrary, the term "insulating" should be understood as "electrically insulating".

Below, and unless specified to the contrary, the term "casing" should be understood as "conductive outer casing".

It should be understood that, when the tip is mounted on the body in the first position, it is the first head that is usable, whereas when the tip is mounted on the body in the second position, it is the second head that is usable. When one head is usable, the other head is arranged inside the body. In other words, the body is at least partially hollow and is configured to receive the first or the second head respectively in the second or first position of the tip. Thus, the body makes it possible to "stow" one head while the other head is usable. The body is used to protect the head stowed in that way. In the meaning of the invention, the term "body" generally refers to the combination of all of the elements that do not form part of the tip.

All or part of the body forms a grip portion of the manual device. The tip is configured so that the user can mount it on the body in the first or the second position. Thus, depending on the user's choice, the tip may be mounted on the body in the first or the second position, and the manual device may be used by handling it via the body in order to use the head as selected in this way that is projecting from the body.

Since the tip has two heads, the first head comprising a pad for a capacitive screen, the manual device may be used with a capacitive screen with the first head, while the second head enables the manual device to be used, by way of example, for some other use. By way of example, the second head may comprise an eraser for erasing writing, or a friction body for causing writing written with thermochromic ink to change color (generally be made invisible).

It can be understood that the pad is a termination configured to interact with a capacitive screen. The pad is electrically conductive (because of the material out of which it is made, or because of a coating). The shape, the flexibility/stiffness, and the material(s) of a pad are not limited, providing the pad is capable of interacting with a capacitive screen, i.e. providing the screen can detect it making contact therewith.

Thus, the manual device is more general-purpose, or less specific, than the known devices of the prior art. Such a manual device forms a "two-in-one" device, presenting two "tools" in just one device. The overall cost of such a device is less than the combined cost of two distinct conventional devices, each forming a "tool" equivalent to one of the heads.

It should be understood that the casing has an internal housing receiving the first head and the second head. Since the casing is conductive, e.g. made of metal, a plastics material filled with carbon black or with metal fibers, or a plastics material covered in a conductive coating such as paint, varnish, or a metal layer deposited by vacuum deposition, electrical contact can easily be made firstly between the casing and the first head with the first pad and/or the second head, and secondly between the casing and at least one portion of the body.

It should also be understood that assembly by snap-fitting is a method of assembling two portions by fitting and elastic deformation (in general local deformation, e.g. of a tongue, or by deformation of all of the parts involved in the assembly). When the two portions are engaged in the snap-fitting position, the portions generally return to their initial shape and no longer present any elastic deformation (or they present less elastic deformation). When the two portions are engaged with each other in the snap-fitting position, they co-operate with each other in such a manner as to oppose, or even block, relative movements of said portions in the release direction (the direction opposite the fitting direction). In the snap-fitting position, the two portions may further co-operate so as to oppose, or even block, their relative movements in the direction for extending their fitting, beyond the snap-fitting position.

Naturally, assembly by snap-fitting may be permanent, i.e. once the two parts are snap-fastened together, it is no longer possible to separate them from each other, or reversible, i.e. the parts can be assembled together or separated at will. Permanent snap-fitting facilitates assembly during fabrication while being particularly reliable and robust in use, whereas reversible assembly provides great flexibility of use, in particular for replacing or verifying parts during the lifetime of the device.

Assembly by snap-fitting presents the advantage of being easy to implement, reliable, and inexpensive.

By way of example, in order to snap-fit the casing with the internal part, the manual device comprises a first snap-fitting system presenting at least one first portion in relief on the inside surface of the casing, and at least one second portion in relief formed on the outside surface of the internal part and configured to co-operate with the first portion in relief by complementary shapes.

It should therefore be understood that the internal part is snap-fitted to the casing while blocking the first head and the second head relative to the casing. In other words, the heads are blocked between the internal part and the casing. Naturally, it should be understood that the blocking is performed relative to at least one degree of freedom (i.e. to move in translation and/or in rotation), but not necessarily relative to all degrees of freedom. By way of example, the heads may be blocked relative to all three degrees of freedom to move in translation but remain free to rotate about one degree of freedom.

By means of this assembly structure, when the internal part is assembled with the casing, the first and second heads are blocked simultaneously between the casing and the internal part.

Such an assembly structure presents a relatively small number of parts, while being reliable and robust, which makes it particularly well suited for industrial production on a large scale and at a low cost.

In some embodiments, the second head comprises a second pad for a capacitive screen. It should be understood that the second pad is distinct from the first pad.

In some embodiments, the first pad is different to the second pad.

By way of example, the first and second pads differ in their size and/or contact area with a capacitive screen, and/or shape, and/or materials, and/or stiffness, etc.

The manual device thus presents two distinct pads making it suitable for use with different capacitive screens. The versatility of the manual device for using capacitive screens is thus increased. By way of example, the contact areas of the first and second pads are adapted to capacitive screens presenting different degrees of precision. Thus, by way of example, the pad having the greater contact area is used with the capacitive screen of a multi-media tablet, while the pad having the smaller contact area is used with the capacitive screen of a mobile telephone, the screen of a multi-media tablet generally being less precise than the screen of a mobile telephone.

In some embodiments, the first pad is in electrical contact with at least a portion of the body when the tip is mounted in the first position.

In some embodiments, the second pad is in electrical contact with at least a portion of the body when the tip is mounted in the second position.

The term "at least a portion of the body" refers to any part of the manual device not forming part of the tip. By way of example, this part is an outside part of the manual device, e.g. a grip portion, or an inside part of the manual device.

The electrical contact between the first/second pad and the body, or a portion of the body, may be direct or indirect. Thus, in a variant, the first/second pad is in direct contact with a portion of the body. In another variant, the first/second pad is in electrical contact with the body or with a portion of the body via an intermediate part, e.g. via the internal part and/or the casing.

Such electrical contact makes it possible to ensure that a capacitive screen is sensitive to the presence of the first/second pad when the user handles the manual device in the hand and moves said pad up to the capacitive screen.

In some embodiments, the body presents at least one conductive portion, the first/second pad being in electrical contact at least with the conductive portion of the body when the tip is mounted in the first/second position.

In a variant, the conductive portion is a grip portion of the body. In another variant, the conductive portion is an inside portion of the body (i.e. a portion that is not intended to be held directly in a user's hand), e.g. an internal conductive rod. In yet another variant, the body has an internal conductive portion and a conductive grip portion.

In some embodiments, the manual device includes a snap-fitting system (or second snap-fitting system) for mounting the tip in the first position and/or in the second position, said snap-fitting system presenting at least a first portion in relief formed on the casing and at least a second portion in relief formed on the body and configured to co-operate with the first portion in relief by complementary shapes, the casing being in electrical contact with the body at least by means of the snap-fitting system when the tip is in the first position and/or in the second position.

It should be understood that the snap-fitting system makes it possible to mount the tip in the first position only or in the second position only, or also in both the first and the second positions. Naturally, the system for snap-fitting the casing and the body together is a reversible snap-fitting system, making it possible to change the position of the tip at will. Such a snap-fitting system leads to the manual device being particularly easy and user-friendly to use, while also enabling the casing and the body to be assembled together reliably, robustly, and at low cost of fabrication.

In some embodiments, the casing extends in an axial direction, and a head selected from the first head and the second head co-operates axially with a first shoulder axially defining a first axial casing portion and a second axial casing portion, said head extending in the first axial casing portion by projecting from the casing.

In the axial direction, the casing presents a first portion and a second portion. The first and second portions of the casing are separated by a first shoulder. One of the two heads is mounted by fitting in the casing, and more particularly in the first axial casing portion, and co-operates with the first shoulder, e.g. in abutment or pressing thereagainst. Assembling in this way makes it possible to establish electrical contact easily between said head and the casing.

In some embodiments, said head includes a base forming a shoulder co-operating with the first shoulder in such a manner as to establish electrical contact between said head and the casing.

The base includes the portion of said head that is configured to co-operate with the first shoulder. By way of example, the base is conductive and co-operates with the first shoulder by pressing thereagainst. Since the casing is also conductive, electrical contact is thus established. In a variant, the base is not conductive but presents at least one contact portion that co-operates with the first shoulder, or an additional contact portion of the first shoulder. In another variant, the base is conductive and presents at least one contact portion.

In some embodiments, the base is blocked axially between the first shoulder and the internal part.

Assembling in this way makes it possible to ensure simple and effective mechanical mounting of the first head on the casing while ensuring electrical contact.

In some embodiments, the other head selected from the first head and the second head includes a pad for a capacitive screen, said pad being mounted on the internal part in such a manner as to be in electrical contact with the casing.

When said other head is the first head, then said pad is the first pad. When said other head is the second head, then said pad is the second pad. Contact between the pad and the casing may be direct, with the pad physically touching the casing, or indirect, e.g. via the internal part or another part. When the pad is in direct contact with the casing, the number of contacts between distinct parts are limited, which decreases the risk of malfunction.

In some embodiments, the casing comprises a skirt, the pad of said other head being fitted at least in part in the skirt and in contact with the skirt.

It should be understood that the pad is fitted in the skirt while projecting from the skirt so as to be able to use said pad. The pad is in contact with the casing via the skirt of the casing. In some embodiments, the skirt is formed integrally as a single piece together with the casing. In a variant, at least a portion of the pad is blocked between the skirt and the internal part, whereby direct contact is provided between the skirt and the pad.

In some embodiments, the casing and the internal part extend in an axial direction, at least one axial end of the internal part being inserted into a head.

It should be understood that the internal part has two axial ends that are opposite to each other in the axial direction, only one axial end being suitable for being inserted into a single head, or each axial end being inserted into a head. Inserting an axial end of the internal part into a head makes it possible to facilitate blocking of said head between the internal part and the casing. This also enables the characteristics of the head to be adjusted, e.g. when the head includes a pad, making it possible to adjust its stiffness and/or to limit the amplitude of its deformation when it is used on a capacitive screen.

In some embodiments, said axial end co-operates by complementary shapes with all or part of the head.

This makes it possible to optimize the co-operation between the head and the internal part.

In some embodiments, the body extends in an axial direction and presents a first distal end on which the tip is mounted.

It should be understood that when the casing extends in an axial direction, the axial direction of the body and the axial direction of the tip are parallel. Preferentially, the body and the casing lie on the same axis in the axial direction. A longitudinal body (i.e. extending in an axial direction) is advantageously ergonomic for handling a tip for a capacitive screen.

In some embodiments, the body presents a second distal end opposite to the first distal end, the second distal end presenting a writing tip or the equivalent.

For example, the writing tip or the equivalent is a ballpoint, a felt tip, a mechanical pencil tip, a rigid tip for a resistive screen, the tip of a punch, or the tip of any other manual device.

Thus, the manual device forms a "three-in-one device", the first end carrying the reversible tip while the second end presents a writing tip or the equivalent.

In yet another example, another reversible tip of the invention is mounted on the second distal end. The manual device thus forms a "four-in-one" device.

BRIEF DESCRIPTION OF THE DRAWINGS

The invention and its advantages can be better understood on reading the detailed description of various embodiments of the invention given as non-limiting examples. The description refers to the accompanying sheets of figures, in which.

DETAILED DESCRIPTION OF EMBODIMENTS

Figure 1:
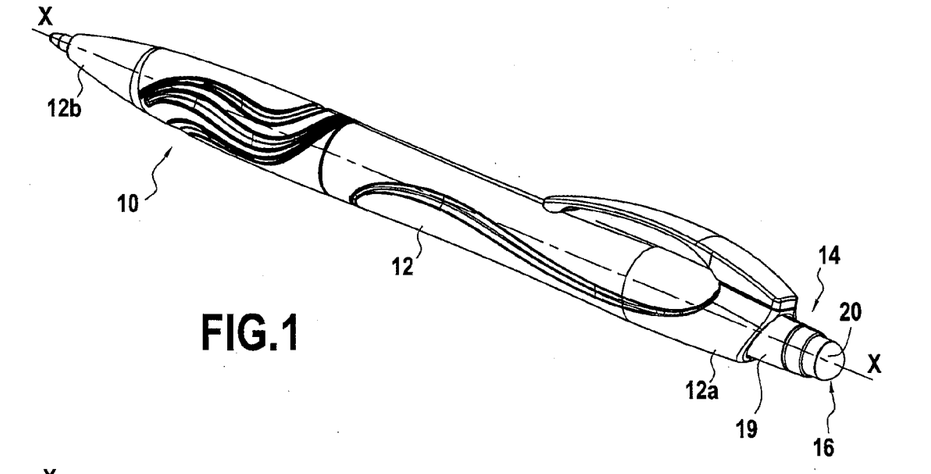
FIG. 1 shows a manual device in a first embodiment, seen in perspective, the tip being mounted on the body in a first position.
Figure 2:
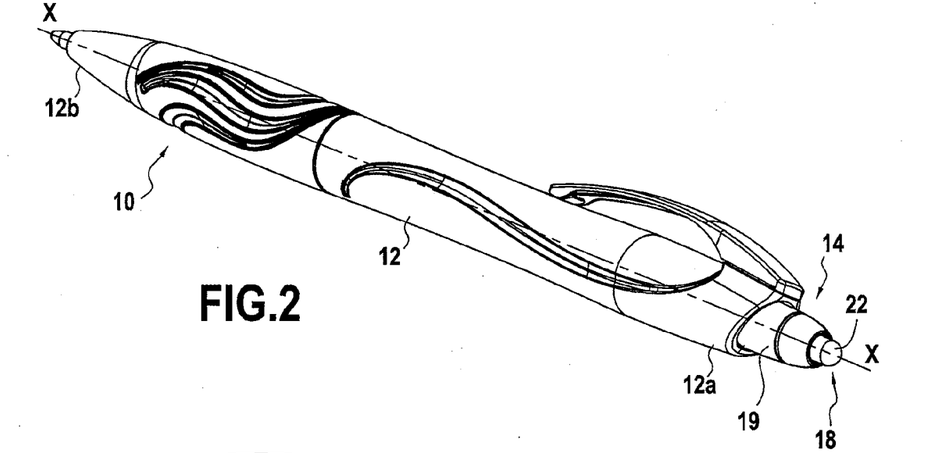
FIG. 2 shows the FIG. 1 manual device, the tip being mounted on the body in a second position.
Figure 3:
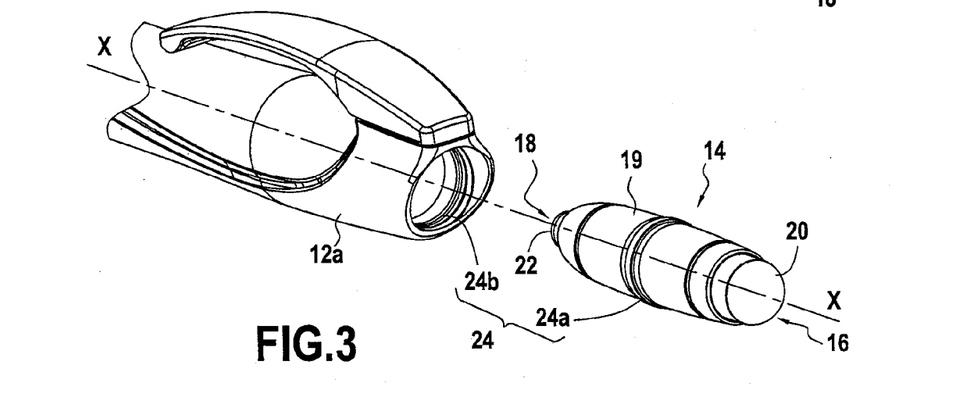
FIG. 3 is a detailed view of the distal end of the manual device carrying the tip, the tip being disconnected.
Figure 4:
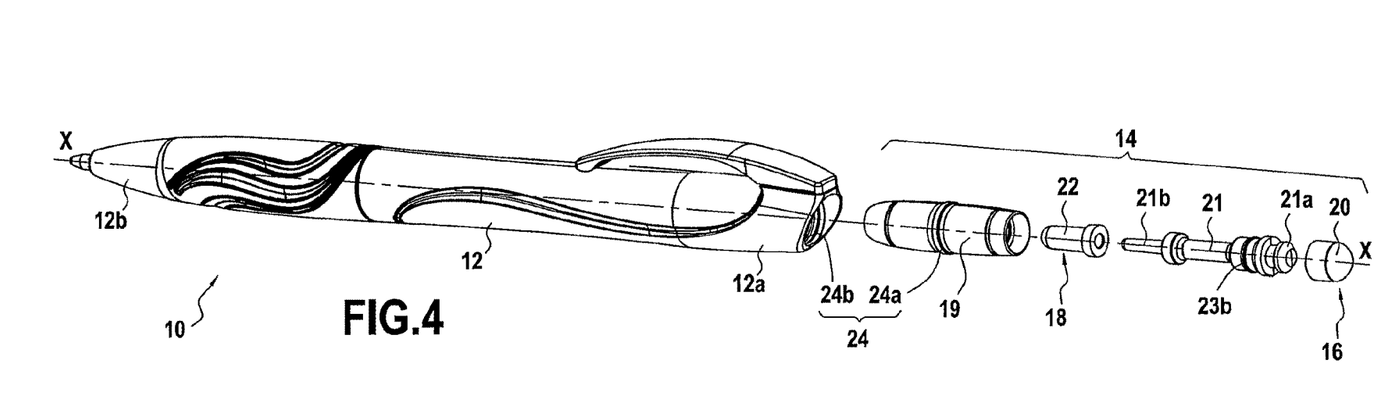
FIG. 4 shows the same view as FIG. 1 in which the tip is shown in an exploded view.
Figure 5:
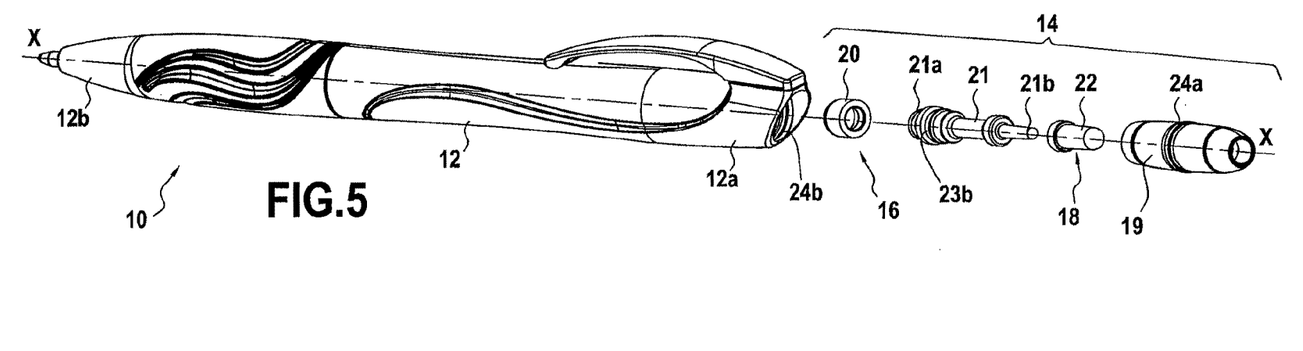
FIG. 5 shows the same view as FIG. 2 in which the tip is shown in an exploded view.
Figure 6:
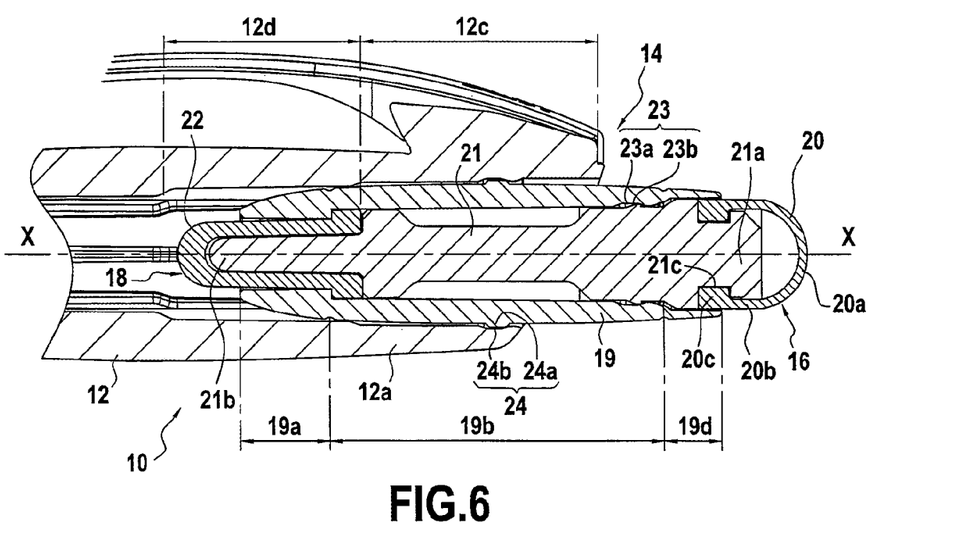
FIG. 6 is a partial axial section view of the manual device, the tip being mounted in the first position.
Figure 7:
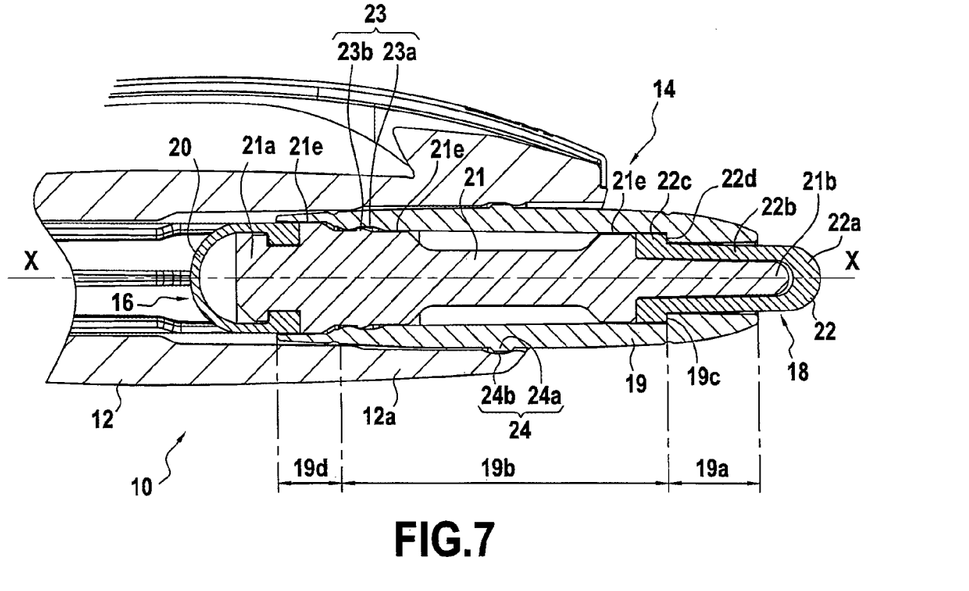
FIG. 7 is a partial axial section view of the manual device, the tip being mounted in the second position.

An embodiment of a manual device is described with reference to FIGS. 1 to 7. In FIGS. 1 and 6, the tip is mounted in the first position, whereas in FIGS. 2 and 7 the tip is mounted in the second position. However, this labeling of a mounting position of the tip as the "first" or "second" position is completely arbitrary. Thus, it could be considered that FIGS. 1 and 6 show the tip in the second position while FIGS. 2 and 7 show the tip in the first position. In which circumstances, the labeling of the heads, pads, etc. should also be interchanged relative to the description given below.

The manual device 10 comprises a body 12 extending longitudinally in an axial direction X, the body 12 presenting a first distal end 12*a* and a second distal end 12*b* that is opposite to the first distal end 12*a* in the axial direction X.

The first distal end 12*a* is provided with a reversible tip 14 while the second distal end 12*b* is provided with a writing tip, in this example, a ballpoint pen. Naturally, in a variant, the writing tip may be a mechanical pencil tip, a felt tip, or the equivalent. The tip may be stationary, or retractable using any conventional means known by the person skilled in the art.

The reversible tip 14 extends longitudinally in the axial direction X and includes a first head 16, and a second head 18 that is opposite the first head 16 in the axial direction X. The tip 14 comprises a conductive outer casing 19, in which the first head 16 and the second head 18 are fitted. In this example, the casing 19 is made of plastic, and more particularly of acrylonitrile butadiene styrene (ABS), filled with carbon black.

In the first position of the tip 14, in FIGS. 1 and 6, the first head 16 projects from the body 12 while the second head 18 is stored inside the body 12. Conversely, in the second position of the tip 14, in FIGS. 2 and 7, the second head 18 projects from the body 12 while the first head 16 is stored inside the body 12.

The first head 16 comprises a first pad 20 for a capacitive screen, while the second head 18 comprises a second pad 22 for a capacitive screen. The first pad 20 and the second pad 22 are made of conductive material, in this example out of silicone filled with carbon black. In a variant, and by way of example, the second head comprises an eraser or a friction body rather than a second pad, said eraser or friction body being suitable for presenting the same shape as the second pad 22.

The first pad 20 is mounted on an internal part 21. The first pad 20 presents a distal end 20*a* for co-operating with a capacitive screen, this end 20*a* in this example being substantially in the shape of a hollow hemisphere (see FIG. 6). The end 20*a* extends a fastener portion 20*b* that is substantially in the shape of a hollow cylinder. The fastener portion 20*b* has a collar 20*c* arranged in the vicinity of the free end of the fastener portion 20*b*, on the inside of the fastener portion 20*b*. The collar 20*c* co-operates by snap-fitting with an annular groove 21*c* formed in a first axial end 21a of the internal part 21. Thus, the axial end 21a of the internal part is inserted into the first head 16, in this example in the first pad 20. This axial end 21a co-operates by complementary shapes with an inside portion of the first pad 20, in this example with the inside of the fastener portion 20b of the first pad 20.

The second pad 22 presents a distal end 22a for co-operating with a capacitive screen, this end 22a in this example being substantially in the shape of a hollow hemisphere (see FIG. 7). The end 22a extends a fastener portion 22b that is substantially in the shape of a hollow cylinder. This fastener portion 22b extends axially between the end 22a and a base 22c. The base 22c forms an annular collar projecting radially outwards relative to the fastener portion 22b. The face of the collar of the base 22c arranged on the end of the fastener portion 22b forms a shoulder 22d. In addition, the second axial end 21b of the internal part 21 (which is opposite the direction axial to the first axial end 21a) is inserted in the second head 18, in this example in the second pad 22. This axial end 21b co-operates by complementary shapes with the inside of the second pad 22, in this example with the inside of the fastener portion 22b and the end 22a of the second pad 22.

In this example, the casing 19 extends in the axial direction X and presents symmetry of revolution about the axis X. The casing 19 presents a first axial casing portion 19a and a second axial casing portion 19b. A first shoulder 19c axially defines the first portion 19a and the second portion 19b. The first and second axial portions 19a and 19b are adjacent. The inside diameter of the first axial portion 19a is less than the inside diameter of the second axial portion 19b. At the other end of the first axial portion 19a in the axial direction X, the casing 19 presents a skirt 19d adjacent to the second axial portion 19b. Thus, in the axial direction X, the casing presents in succession: the first axial portion 19a; the second axial portion 19b; and the skirt 19d. The inside diameter of the second portion 19b is less than the inside diameter of the skirt 19d.

The casing 19 presents a first portion in relief, in this example an annular groove 23a formed in the inside surface of the second portion 19b. The first portion in relief 23a co-operates with a second portion in relief of the internal part 21, in this example an annular rib 23b, to form a snap-fitting system 23 (or first snap-fitting system) for assembling the casing 19 to the internal part 21 by snap-fitting. The annular rib 23b and the annular groove 23a co-operate by complementary shapes. Naturally, in a variant the rib may be formed on the inside surface of the casing, whereas the groove is made in the surface of the internal part. Thus, the snap-fitting system 23 enables the internal part 21 and the casing 19 to be assembled by snap-fitting.

The second head 18 extends in the first axial casing portion 19a and it co-operates axially with the first shoulder 19c (see FIG. 7). The second head 18 projects from the first axial casing portion 19a. In particular, in this example, the base 22c, and more particularly the shoulder 22d, co-operates axially with the first shoulder 19c of the casing 19. The second pad 22, and more particularly the fastener portion 22b, extends axially in the first axial portion 19a, while the distal end 22a of the second pad 22 projects from the first axial portion 19a, and therefore from the casing 19.

The internal part 21 and the casing 19 clamp the base 22c in the axial direction X. Since the internal part 21 is snap-fitted to the casing 19, it causes said base 22c to press against the first shoulder 19c. In other words, the second head 18, and more particularly in this example, the second pad 22, is blocked between the casing 19 and the internal part 21. Since the second pad 22 and the casing 19 are made of conductive materials, this configuration ensures there is electrical contact between the casing 19 and the second pad 22 caused at least by the shoulder 22d co-operating with the first shoulder 19c by pressing thereagainst.

The first pad 20 is fastened to the internal part 21 by means of the collar 20c engaged in the groove 21c (see FIG. 6). The first axial end 21a of the internal part presenting said groove 21c extends in part in the skirt 19d from the casing 19 in such a manner that the fastener portion 20b of the first pad 20 is radially blocked between the internal part 21 and the skirt 19d. Thus, the collar 20c is blocked inside the groove 21c, and that locks mounting of the first pad 20 on the internal part 21. In other words, the first head 16, and more particularly in this example, the first pad 20, is blocked between the casing 19 and the internal part 21. Naturally, the distal end 20a of the first pad projects axially from the skirt 19c, and therefore from the casing 19.

The skirt 19d is in contact with the fastener portion 20b of the first pad 20. Since the casing 19 and the first pad 20 are conductive, this configuration ensures there is electrical contact between the casing 19 and the first pad 20.

In addition, in order to hold of the pads 20 and 22 better, the internal part 21 presents portions 21e, in this example three portions 21e spaced apart in the axial direction X, these portions presenting an outside diameter that is substantially equal to the inside diameter of the corresponding portions of the casing 19 (i.e. the diameters are such that they make fitting possible, said diameters being equal to within plus or minus 1% to 3%). In other words, the portions 21e present a diameter matching the corresponding portions of the casing 19. This enables better blocking of the pads and more robust assembly by snap-fitting. Thus, in general, the internal part 21 co-operates fully or in part with the casing 19 by fitting by complementary shapes.

In this example, the internal part 21 is made of an insulating material. In a variant, the internal part 21 is made of conductive material and also contributes to providing electrical contact between the first and second pads 20, 22 and the casing 19, although that is not its main function.

On its outer periphery, the casing 19 presents an annular rib 24a while, on its inside surface the body 12 presents an annular groove 24b. The annular rib and the annular groove 24a and 24b form examples of first and second portions in relief of a snap-fitting system 24 between the tip 14 and the body 12 (or second snap-fitting system). Naturally, in a variant the rib may be formed on the outside surface of the casing, whereas the rib is made in the inside surface of the body. The rib 24a and the groove 24b co-operate by complementary shapes, and they ensure electrical contact between the body 12 and the casing 14 when the tip 24 is snap-fitted to the body 12. Thus, in this example, the first and second pads 20 and 22 are directly in contact with the casing 19, which is itself in direct contact with the body 12, the groove and the rib 24a and 24b of the second snap-fitting system 24, by means of their co-operation, ensuring contact between the tip 14 and the body 12, in such a manner that the pads 20 and 22 are in electrical contact with the body 12. In this example, the body 12 is made of a conductive material, e.g. a plastics material, and more particularly out of ABS (or Acrylonitrile Butadiene Styrene), filled with carbon black, in such a manner that when the user handles the body 12, the user's fingers are in electrical contact with the pads 20 and 22, which makes it possible to cause the pads to interact with a capacitive screen.

In order to hold of the tip 14 better in the body 12, the tip 14 is housed in part in a first axial portion 12c of the body and in part in a second axial portion 12*d* of the body. The first axial portion 12*c* includes the groove 24*b* of the snap-fitting system 24. The second axial portion 12*d* is adjacent to the first axial portion 12*c*, is arranged on the end of the second distal end 12*b* of the body 12 relative to the first axial portion 12*c*, and presents an inside diameter that is smaller than the inside diameter of the first axial portion 12*c*. The inside diameter of the second axial portion 12*d* matches at least in part an outside diameter of the tip 14, in this example of the casing 19. The second axial portion 12*d* thus forms a movement limiter for limiting movement in a direction perpendicular to the axial direction X. This enables the tip 14 to be held better in the body 12 and assembly by snap-fitting to be more robust.

Although the present invention is described with reference to specific embodiments, it is clear that modifications and changes may be made to those embodiments without going beyond the general ambit of the invention as defined by the claims. In particular, individual characteristics of the various embodiments that are shown and/or described may be combined to make additional embodiments. Consequently, the description and the drawings should be considered in a sense that is illustrative rather than restrictive.

The invention claimed is:

1. A manual device comprising: a body and at least one reversible tip mounted on the body, the reversible tip including a first head and a second head opposite to the first head, the reversible tip being configured to be mounted on the body in a first position in which the first head projects from the body while the second head is stored inside the body or in a second position in which the second head projects from the body while the first head is stored inside the body, the reversible tip comprising a casing that is a conductive outer casing and an internal part, the casing and the internal part extending in an axial direction, the internal part being arranged inside the casing and at least one axial end of the internal part being inserted into either the first head or the second head, the first head including a first pad for a capacitive screen, the first head and the second head being blocked between the internal part and the casing, the internal part being assembled by snap-fitting to the casing such that the first head and the second head project from the casing.

2. A manual device comprising: a body and at least one reversible tip mounted on the body, the reversible tip including a first head and a second head opposite to the first head, the reversible tip being configured to be mounted on the body in a first position in which the first head projects from the body while the second head is stored inside the body or in a second position in which the second head projects from the body while the first head is stored inside the body, the reversible tip comprising a casing that is a conductive outer casing and an internal part arranged inside the casing, the first head including a first pad for a capacitive screen, the first head and the second head being blocked between the internal part and the casing, the internal part being assembled by snap-fitting to the casing, the first head and the second head project from the casing, wherein the second head includes a second pad for a capacitive screen, wherein the second pad is in electrical contact with at least a portion of the body when the reversible tip is mounted in the second position.

3. The manual device according to claim 2, wherein the first pad is different from the second pad.

4. A manual device comprising: a body and at least one reversible tip mounted on the body, the reversible tip including a first head and a second head opposite to the first head, the reversible tip being configured to be mounted on the body in a first position in which the first head projects from the body while the second head is stored inside the body or in a second position in which the second head projects from the body while the first head is stored inside the body, the reversible tip comprising a casing that is a conductive outer casing and an internal part arranged inside the casing, the first head including a first pad for a capacitive screen, the first head and the second head being blocked between the internal part and the casing, the internal part being assembled by snap-fitting to the casing, the first head and the second head project from the casing, wherein the first pad is in electrical contact with at least a portion of the body when the reversible tip is mounted in the first position.

5. The manual device according to claim 1, including a snap-fitting system for mounting the reversible tip in the first position or in the second position, said snap-fitting system presenting at least a first portion in relief formed on the casing and at least a second portion in relief formed on the body and configured to co-operate with the first portion in relief by complementary shapes, the casing being in electrical contact with the body at least by the snap-fitting system when the reversible tip is in the first position or in the second position.

6. A manual device comprising: a body and at least one reversible tip mounted on the body, the reversible tip including a first head and a second head opposite to the first head, the reversible tip being configured to be mounted on the body in a first position in which the first head projects from the body while the second head is stored inside the body or in a second position in which the second head projects from the body while the first head is stored inside the body, the reversible tip comprising a casing that is a conductive outer casing and an internal part arranged inside the casing, the first head including a first pad for a capacitive screen, the first head and the second head being blocked between the internal part and the casing, the internal part being assembled by snap-fitting to the casing, the first head and the second head project from the casing, wherein the casing extends in an axial direction, and in which a selected head selected from the first head and the second head co-operates axially with a first shoulder axially defining a first axial casing portion and a second axial casing portion, said selected head extending in the first axial casing portion by projecting from the casing.

7. The manual device according to claim 6, wherein said selected head includes a base forming a shoulder co-operating with the first shoulder in such a manner as to establish electrical contact between said selected head and the casing.

8. The manual device according to claim 7, wherein the base is axially blocked between the first shoulder and the internal part.

9. The manual device according to claim 6, wherein the other head selected from the first head and the second head includes the first pad or a second pad for a capacitive screen, the first pad or the second pad being mounted on the internal part in such a manner as to be in electrical contact with the casing.

10. The manual device according to claim 9, wherein the casing includes a skirt, the first pad or the second pad of said other head being fitted at least in part in the skirt and in contact with the skirt.

11. The manual device according to claim 1, wherein said at least on axial end co-operates by complementary shapes with all or part of the first head or the second head.

12. The manual device according to claim 1, wherein the body extends in the axial direction and presents a first distal end on which the reversible tip is mounted.

13. The manual device according to claim 12, wherein the body presents a second distal end opposite to the first distal end, the second distal end presenting a writing tip.

* * * * *

UNITED STATES PATENT AND TRADEMARK OFFICE
CERTIFICATE OF CORRECTION

PATENT NO. : 10,372,240 B2
APPLICATION NO. : 15/527492
DATED : August 6, 2019
INVENTOR(S) : Malinverni et al.

Page 1 of 1

It is certified that error appears in the above-identified patent and that said Letters Patent is hereby corrected as shown below:

On the Title Page

Under "Foreign Application Priority Data":
Item (30) – please add: -- November 19, 2014 (FR) 1461209 --.

Signed and Sealed this
Twenty-second Day of October, 2019

Andrei Iancu
*Director of the United States Patent and Trademark Office*